(12) United States Patent
Sharma et al.

(10) Patent No.: US 11,159,994 B2
(45) Date of Patent: Oct. 26, 2021

(54) UPLINK SIGNAL BASED HANDOVER CONTROL, HANDOVER CANCELLATION AND HANDOVER EXPIRATION

(71) Applicant: Sony Mobile Communications Inc., Tokyo (JP)

(72) Inventors: Vivek Sharma, Weybridge (GB); Yuxin Wei, Weybridge (GB); Brian Martin, Weybridge (GB); Hideji Wakabayashi, Weybridge (GB); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/475,653

(22) PCT Filed: Dec. 18, 2017

(86) PCT No.: PCT/EP2017/083191
§ 371 (c)(1),
(2) Date: Jul. 2, 2019

(87) PCT Pub. No.: WO2018/127389
PCT Pub. Date: Jul. 12, 2018

(65) Prior Publication Data
US 2019/0380072 A1 Dec. 12, 2019

(30) Foreign Application Priority Data
Jan. 5, 2017 (EP) ..................................... 17150360

(51) Int. Cl.
*H04W 36/00* (2009.01)
*H04W 36/08* (2009.01)
(Continued)

(52) U.S. Cl.
CPC . *H04W 36/00835* (2018.08); *H04W 36/0016* (2013.01); *H04W 36/0085* (2018.08);
(Continued)

(58) Field of Classification Search
CPC ......... H04W 36/0016; H04W 36/0085; H04W 36/08; H04W 36/30; H04W 36/385
(Continued)

(56) References Cited

U.S. PATENT DOCUMENTS

2008/0102838 A1  5/2008  Takai
2010/0027507 A1  2/2010  Li
(Continued)

FOREIGN PATENT DOCUMENTS

WO    2016163786 A1    10/2016

OTHER PUBLICATIONS

International Search Report and Written Opinion from counterpart International Patent Application No. PCT/EP2017/083191, dated Mar. 29, 2018; 24 pages.

*Primary Examiner* — Robert J Lopata
(74) *Attorney, Agent, or Firm* — Tucker Ellis LLP

(57) ABSTRACT

In a handover procedure of a wireless communication device (100), a source base station (110) of the handover sends a message to the wireless communication device (100). The message indicates authorization of a handover of the wireless communication device from the source base station to at least one candidate base station (120, 130), which is prepared to act as a target base station of the handover. Further, the source base station (110) instructs the wireless communication device (100) to send at least one uplink signal. The source base station (110) receives at least one report of a measurement performed by the at least one candidate base station (120, 130) on the at least one uplink signal. Based on the at least one measurement, the source base station (110) controls the handover.

16 Claims, 9 Drawing Sheets

(51) Int. Cl.
    *H04W 36/30*     (2009.01)
    *H04W 36/38*     (2009.01)

(52) U.S. Cl.
    CPC ..... *H04W 36/00837* (2018.08); *H04W 36/08* (2013.01); *H04W 36/30* (2013.01); *H04W 36/385* (2013.01)

(58) Field of Classification Search
    USPC .......................................................... 370/330
    See application file for complete search history.

(56) References Cited

U.S. PATENT DOCUMENTS

| | | | |
|---|---|---|---|
| 2015/0282033 A1 | 10/2015 | Lunden | |
| 2015/0319650 A1 | 11/2015 | Wang | |
| 2016/0021591 A1* | 1/2016 | Lin | H04W 36/30 370/332 |
| 2016/0044551 A1* | 2/2016 | Frenger | H04B 7/0619 370/252 |
| 2017/0215117 A1 | 7/2017 | Kwon | |
| 2017/0332283 A1* | 11/2017 | Kubota | H04W 36/0058 |
| 2018/0124673 A1* | 5/2018 | Tenny | H04W 72/1268 |
| 2018/0132158 A1* | 5/2018 | Tseng | H04W 36/0088 |
| 2018/0368046 A1* | 12/2018 | Zhang | H04W 36/30 |
| 2019/0174362 A1* | 6/2019 | Yang | H04W 36/0072 |
| 2019/0182732 A1* | 6/2019 | Wei | H04W 36/0066 |
| 2020/0305094 A1* | 9/2020 | Ouchi | H04L 5/0055 |

* cited by examiner

UPLINK SIGNAL BASED HANDOVER CONTROL, HANDOVER CANCELLATION AND HANDOVER EXPIRATION

FIELD OF THE INVENTION

The present invention relates to methods of controlling communication in a wireless communication network and to corresponding devices and systems.

BACKGROUND OF THE INVENTION

Wireless communication networks, such as a cellular network based on the LTE (Long Term Evolution) radio technology specified by 3GPP ($3^{rd}$ Generation Partnership Project), mobility of a user equipment (UE) in the coverage area of the wireless communication network may involve that the UE performs a handover from one base station, referred to as source base station, to another base station, also referred as target base station.

For example, when in LTE radio technology a UE is in connected mode, i.e., maintains an active data connection to the wireless communication network, it is typically configured to perform channel quality measurements on down-link (DL) reference signals from neighboring base stations and report such channel quality measurements in accordance with certain event-based reporting criteria. On the basis of the reports, the base station serving the UE then decides whether to initiate a handover of the UE to one of the neighboring base stations.

However, in some situations this way of initiating a handover may provide unsatisfactory results. For example, due to limitations of the UE with respect to performing the channel quality measurements, the channel quality measurements performed by the UE may be subject to measurement errors, resulting in inappropriate triggering of a handover or inappropriate selection of a target base station of the handover. Further, the reporting of measurements may fail for example due to fast movement of the UE.

Accordingly, there is a need for techniques that allow for controlling a handover in an accurate and efficient manner.

SUMMARY OF THE INVENTION

According to an embodiment, a method of controlling communication in a wireless communication network is provided. According to the method, a wireless communication device receives a message from a base station, in the following also referred to as source base station. The message indicates authorization of a handover of the wireless communication device from the source base station to at least one candidate base station which is prepared to act as a target base station of the handover. In response to the message, the wireless communication device sends at least one uplink (UL) signal for measurements by the at least one candidate base station. In some cases, the at least one UL signal may also be used for measurements by the source base station. Depending on the measurements based on the UL signal the handover may then be controlled in a precise and efficient manner. Due to enhanced measurement capabilities of the base stations, adverse effects of measurement errors on the handover may be avoided. The measurements may for example be used for triggering the handover and/or for selecting one of the candidate base stations as the target base station of the handover. The measurements may for example be channel quality measurements.

According to an embodiment, the wireless communication device receives a further message triggering the handover. If a plurality of candidate base stations are prepared to act as the target base station of the handover, the further message triggering the handover may also indicate the candidate base station, which based on the measurements was selected as the target base station of the handover. Selection of the target base station and triggering of the handover may thus be indicated in an efficient manner, using the same message. The further message may be received from the source base station. However, the further message may be received from the candidate base station, e.g., the candidate base station selected from a plurality of candidate base stations as the target base station. The latter alternative may be useful if the channel quality of between the source base station and the wireless communication device is too low for sending the further message directly from the source base station to the wireless communication device.

According to an embodiment, the message from the source base station indicates a configuration to be applied by the wireless communication device for sending the at least one UL signal. For example, the message from the source base station may indicate radio resources for sending the at least one UL signal. In this way, utilization of the at least one UL signal for controlling the handover may be managed in a resource efficient manner and collisions of the UL signal with other signals may be avoided.

According to an embodiment, the wireless communication device starts a timer upon receiving the message from the source base station. Upon expiry of the timer, the wireless communication device stops the sending of the at least one UL signal. In this way, excessive utilization of radio resources for sending the UL signal can be avoided.

According to an embodiment, the message from the source base station further indicates resources reserved for the handover. For example, the message can indicate a signature sequence to be used by the wireless communication device for a random access procedure for accessing a cell of the target base station of the handover. In this way, the wireless communication device can be prepared early for the execution of the handover to thereby facilitate and expedite triggering of the handover.

According to an embodiment, the wireless communication device starts a timer upon receiving the message from the base station. Upon expiry of the timer, the wireless communication device cancels the authorization of the handover and releases resources reserved for the handover. In this way, excessive reservation of resources for the handover can be avoided. This timer may be the same timer as used for controlling stopping sending of the at least one UL signal, but it is to be understood that different timers could be used as well.

According to an embodiment, the wireless communication device receives a further message from the source base station. In response to receiving the further message from the base station, the wireless communication device cancels the authorization of the handover and releases the resources reserved for the handover. In this way, the source base station may stop the handover if the handover is found to be no longer necessary, and excessive reservation of resources for the handover can be avoided.

According to an embodiment, the wireless communication device receives a further message from the source base station. In response to receiving the further message from the source base station, the wireless communication device stops the sending of the UL signal. In this way, excessive utilization of radio resources for sending the UL signal can be avoided, e.g., if the source base station determines that the handover is no longer necessary. The further message can be the same message as described above for cancelling the authorization of the handover and releasing the reserved resources, but it is to be understood that different messages could be used as well.

According to an embodiment, the wireless communication device performs measurements on DL reference signals received from the base station and the at least one candidate base stations, e.g., channel quality measurements, and sends a report of the measurements to the source base station. The wireless communication device may then receive the message from the source base station in response to the report sent to the base station. Accordingly, the UL signal based control of the handover may be initiated on the basis of measurements performed by the wireless communication device on DL reference signals. This may for example allow for efficient preselection of candidate base stations and initial estimation of the radio conditions experienced by the wireless communication device.

According to a further embodiment, a method of controlling communication in a wireless communication network is provided. According to the method, a base station, in the following referred to as source base station, sends a message to a wireless communication device. The message indicates authorization of a handover of the wireless communication device from the source base station to at least one candidate base station, which is prepared to act as a target base station of the handover. Further, the message to the wireless communication device instructs the wireless communication device to send at least one UL signal. The source base station receives reports of measurements performed by the at least one candidate base station on the at least one UL signal. Further, also the source base station may receive the at least one UL signal and perform measurements based on the received UL signal. Based on the measurements, the source base station controls the handover. In this way, the handover may be controlled in a precise and efficient manner depending on the measurements based on the at least one UL signal. Due to enhanced measurement capabilities of the base stations, adverse effects of measurement errors on the handover may be avoided. Based on the measurements, the source base station may for example trigger the handover and/or select the candidate base station as the target base station of the handover. The measurements may for example be channel quality measurements.

According to an embodiment, a plurality of candidate base stations are prepared to act as the target base station of the handover, and based on the measurements the source base station may accomplish selection of one of the candidate base stations as the target base station of the handover. In this way, the selection of the target base station can be based measurements which are performed with high precision and low risk of measurement errors.

According to an embodiment, the source base station sends a further message triggering the handover. If a plurality of candidate base stations are prepared to act as the target base station of the handover, the further message triggering the handover may also indicate the candidate base station, which based on the measurements was selected as the target base station of the handover. Selection of the target base station and triggering of the handover may thus be indicated in an efficient manner, using the same message. The source base station may send the further message triggering the handover directly to the wireless communication device, e.g., via a radio link connecting the wireless communication device to the source base station.

However, the source base station may also send the further message triggering the handover via a candidate base station, e.g., the candidate base station selected as the target base station. The latter alternative may be useful if the channel quality of between the source base station and the wireless communication device is too low for sending the further message directly from the source base station to the wireless communication device.

According to an embodiment, the message to the wireless communication device indicates a configuration to be applied by the wireless communication device for sending the at least one UL signal. For example, the message to the wireless communication device may indicate radio resources for sending the at least one UL signal. In this way, utilization of the at least one UL signal for controlling the handover may be managed in a resource efficient manner and collisions of the at least one UL signal with other signals may be avoided.

According to an embodiment, the message to the wireless communication device indicates resources reserved for execution of the handover. For example, the message can indicate a signature sequence to be used by the wireless communication device for a random access procedure for accessing a cell of the target base station of the handover. In this way, the wireless communication device can be prepared early for the execution of the handover to thereby facilitate and expedite triggering of the handover.

According to an embodiment, the source base station starts a timer upon sending the message to the wireless communication device. Upon expiry of the timer, the base station cancels the authorization of the handover and releases the resources reserved for execution of the handover. In this way, excessive reservation of resources for the handover can be avoided.

According to an embodiment, the source base station sends a further message to the wireless communication device. The further message to the wireless communication device indicates cancellation of the authorization of the handover and instructs the wireless communication device to release, or refrain from using, the resources reserved for the handover. In this way, the source base station may stop the handover if the handover is found to be no longer necessary, and excessive reservation of resources for the handover can be avoided.

According to an embodiment, the source base station sends a further message to the wireless communication device. The further message to the wireless communication device instructs the wireless communication device to stop the sending of the UL signal. In this way, excessive utilization of radio resources for sending the UL signal can be avoided, e.g., if the source base station determines that the handover is no longer necessary.

According to an embodiment, the source base station sends a message to the at least one candidate base station. If there are multiple candidate base stations, the source base station may send a further message to each of the candidate base stations. The message to the respective candidate base station prepares the candidate base station to act as the target base station of the handover. For example, the message may indicate resources reserved for execution of the handover, e.g., a signature applied by the wireless communication device in a random access procedure for accessing the cell of the target base station. Further, the message to the respective candidate base station may indicate an identity of the wireless communication device. Further, the message to the respective candidate base station may indicate radio resources for monitoring the at least one UL signal. Accordingly, the candidate base station may be configured with detailed information to enable efficient monitoring of the at least one UL signal and/or to facilitate or expedite execution of the handover.

According to an embodiment, the source base station sends a further message to the at least one candidate base station. If there are multiple candidate base stations, the source base station may send a further message to each of the candidate base stations. The further message to the respective candidate base station indicates cancellation of the authorization of the handover and instructs the candidate base station to release the resources reserved for the handover. In this way, the source base station may avoid excessive reservation of resources for the handover by the candidate base stations, e.g., if the handover is found to be no longer necessary.

According to an embodiment, the source base station receives, from the wireless communication device, a report of measurements performed by the wireless communication device on DL reference signals received from the base station and the candidate base stations, e.g., reports of channel quality measurements. The source base station may then accomplish sending the message to the wireless communication device in response to the report of the measurements performed by the wireless communication device. Accordingly, the UL signal based control of the handover may be initiated on the basis of measurements performed by the wireless communication device on DL reference signals. This may for example allow for efficient preselection of candidate base stations and initial estimation of the radio conditions experienced by the wireless communication device.

According to a further embodiment, a method of controlling communication in a wireless communication network is provided. According to the method, a base station, in the following referred to as candidate base station, receives a message preparing the candidate base station to act as a target base station of a handover of a wireless communication device from another base station, in the following referred to as source base station. In response to the message preparing the candidate base station, the candidate base station receives at least one UL signal from the wireless communication device and performs measurements based on the received at least one UL signal. The candidate base station then sends a report of the measurements to the source base station. Accordingly, the candidate base station is prepared to support control of the handover based on the at least one UL signal. In this way, the handover may be controlled in a precise and efficient manner depending on the measurements based on the UL signal. Based on the measurements the source base station may for example trigger the handover and/or select the candidate base station as the target base station of the handover. The measurements may for example be channel quality measurements.

According to an embodiment, the candidate base station sends a message to the wireless communication device. The message to the wireless communication device triggers the handover. If a plurality of candidate base stations are prepared to act as the target base station of the handover, the further message triggering the handover may also indicate that the base station was, based on the measurements, selected among the multiple candidate base stations as the target base station of the handover. Selection of the target base station and triggering of the handover may thus be indicated in an efficient manner, using the same message. The sending of the message to the wireless communication device may be instructed by the source base station, or the candidate base station may receive the message from the source base station and then forward it to the wireless communication device. The candidate base station may send the message directly via a radio link connecting the wireless communication device to the source base station. Accordingly, the candidate base station may assist in triggering the handover. This may be useful if the channel quality of between the source base station and the wireless communication device is too low for triggering the handover directly from the source base station.

The message preparing the candidate base station may indicate resources reserved for execution of the handover, e.g., a signature applied by the wireless communication device in a random access procedure for accessing the cell of the target base station. Further, the message preparing the candidate base station may indicate an identity of the wireless communication device. Further, the message preparing the candidate base station may indicate radio resources for monitoring the at least one UL signal. Accordingly, the candidate base station may be configured with detailed information to enable efficient monitoring of the at least one UL signal and/or to facilitate or expedite execution of the handover once the candidate base station is selected as the target base station of the handover.

According to an embodiment, the candidate base station receives a further message from the source base station. The further message from the source base station indicates cancellation of the authorization of the handover and instructs the candidate base station to release the resources reserved for the handover. In this way, excessive reservation of resources for the handover by the candidate base station can be avoided by the source base station, e.g., if the source base station determines that the handover is found to be no longer necessary. Alternatively or in addition, the candidate base station may also start a timer upon receiving the message preparing the base station and release the resources reserved for the handover upon expiry of the timer.

According to a further embodiment, a method of controlling communication in a wireless communication network is provided. According to the method, a wireless communication device receives a message from a base station, in the following also referred to as source base station. The message from the source base station indicates authorization of a handover of the wireless communication device from the source base station to at least one candidate base station which is prepared to act as a target base station of the handover. Further, the wireless communication device starts a timer upon receiving the message from the base station, and upon expiry of the timer cancels the authorization of the handover and releases resources reserved for the handover. Alternatively or in addition, the wireless communication device cancels the authorization of the handover and releases resources reserved for the handover in response to receiving a further message from the base station. In this way, excessive reservation of resources for the authorized but not yet executed handover can be avoided.

According to a further embodiment, a method of controlling communication in a wireless communication network is provided. According to the method, a base station, in the following referred to as source base station, sends a message to a wireless communication device. The message to the wireless communication device indicates authorization of a handover of the wireless communication device from the source base station to at least one candidate base station which is prepared to act as a target base station of the handover. Further, the source base station starts a timer upon sending the message to the wireless communication device, and upon expiry of the timer, cancels the authorization of the handover and releases resources reserved for execution of the handover. Alternatively or in addition, the source base station sends a further message to the wireless communication device and/or to the at least one candidate base station. The further message indicating cancellation of the authorization of the handover and instructs release of resources reserved for the handover. In this way, excessive reservation of resources for the authorized but not yet executed handover can be avoided.

According to a further embodiment, a method of controlling communication in a wireless communication network is provided. According to the method, a base station, in the following referred to as candidate base station, receives a message preparing the candidate base station to act as a target base station of a handover of a wireless communication device from another base station, in the following also referred to as source base station. Further, the candidate base station starts a timer upon receiving the message preparing the candidate base station, and upon expiry of the timer, cancels authorization of the handover and releases resources reserved for execution of the handover. Alternatively or in addition, the candidate base station cancels authorization of the handover and releases resources reserved for the handover in response to receiving a further message.

According to a further embodiment, a wireless communication device is provided. The wireless communication device comprises a radio interface for connecting to a wireless communication network. Further, the wireless communication device comprises one or more processors configured to:
  receive via the radio interface a message from a base station, also referred to as source base station, the message from the source base station indicating authorization of a handover of the wireless communication device from the source base station to at least one candidate base station which is prepared to act as a target base station of the handover; and
  in response to the message from the source base station, send via the radio interface at least one UL signal for measurements by the at least one candidate base stations.

According to a further embodiment, a wireless communication device is provided. The wireless communication device comprises a radio interface for connecting to a wireless communication network. Further, the wireless communication device comprises one or more processors configured to:
  receive via the radio interface a message from a base station, also referred to as source base station, the message from the source base station indicating authorization of a handover of the wireless communication device from the base station to at least one candidate base station which is prepared to act as a target base station of the handover;
  start a timer upon receiving the message from the source base station, and upon expiry of the timer, cancel the authorization of the handover and release resources reserved for the handover; and/or
  in response to receiving a further message via the radio interface from the base station, cancel the authorization of the handover and release resources reserved for the handover.

The wireless communication device of the above-mentioned embodiments may be configured for use in the above-described methods.

The measurements may for example be channel quality measurements.

The message from the source base station may indicate a configuration to be applied by the wireless communication device for sending the at least one UL signal, e.g., radio resources for sending the at least one UL signal.

The one or more processors of the wireless communication device may be configured to:
  receive, via the radio interface, a further message triggering the handover. This further message triggering the handover may also indicate the candidate base station which based on the measurements was selected among multiple candidate base stations as the target base station of the handover.

Further, the one or more processors of the wireless communication device may be configured to:
  start a timer upon receiving the message from the source base station; and
  upon expiry of the timer, cancel the authorization of the handover and stop sending of the at least one UL signal.

Further, the message from the source base station may indicate resources reserved for the handover.

Further, the one or more processors of the wireless communication device may be configured to:
  start a timer upon receiving the message from the source base station; and
  upon expiry of the timer, cancel the authorization of the handover and release resources reserved for the handover.

Alternatively or in addition, the one or more processors of the wireless communication device may be configured to:
  via the radio interface, receive a further message from the source base station; and
  in response to receiving the further message from the source base station, cancel the authorization of the handover and release resources reserved for the handover.

Further, the one or more processors of the wireless communication device may be configured to:
  receive a further message from the source base station; and
  in response to receiving the further message from the source base station, stop the sending of the UL signal.

Further, the one or more processors of the wireless communication device may be configured to:
  perform measurements on DL reference signals received via the radio interface from the source base station and the at least one candidate base station;
  via the radio interface, send a report of the measurements to the source base station; and
  receive the message from the source base station in response to the report sent to source the base station.

According to a further embodiment, a base station is provided. The base station comprises a radio interface for connecting to a wireless communication device. Further, the base station comprises a network interface to other nodes of the wireless communication network. Further, the base station comprises one or more processors configured to:
  via the radio interface, send a message to a wireless communication device, the message indicating authorization of a handover of the wireless communication device from the base station to at least one candidate base station, which is prepared to act as a target base station of the handover, and instructing the wireless communication device to send at least one UL signal;

UL signal—via the network interface, receive reports of measurements performed by the candidate base stations on the at least one UL signal; and control the handover based on the measurements.

According to a further embodiment, a base station is provided. The base station comprises a radio interface for connecting to a wireless communication device. Further, the base station comprises a network interface to other nodes of the wireless communication network. Further, the base station comprises one or more processors configured to:

via the radio interface, send a message to a wireless communication device, the message indicating authorization of a handover of the wireless communication device from the base station to at least one candidate base station, which is prepared to act as a target base station of the handover;

start a timer upon sending the message to the wireless communication device, and upon expiry of the timer cancel the authorization of the handover and release resources reserved for execution of the handover; and/or send a further message to the wireless communication device and/or to the at least one candidate base station, the further message indicating cancellation of the authorization of the handover and instructing release of resources reserved for the handover.

The base station of the above-mentioned embodiments may thus be configured for use as the source base station in the above-described methods.

The measurements may for example be channel quality measurements.

The one or more processors of the base station may be configured to:

based on the measurements, select the candidate base station among multiple candidate base stations as the target base station of the handover.

Further, the one or more processors of the base station may be configured to:

via the radio interface, send a further message triggering the handover. This further message triggering the handover may also indicate the candidate base station which based on the measurements was selected among multiple candidate base stations as the target base station of the handover.

The message to the wireless communication device may indicate a configuration to be applied by the wireless communication device for sending the at least one UL reference, e.g., radio resources for sending the at least one UL signal.

Further, the message to the wireless communication device may indicate resources reserved for execution of the handover.

Further, the one or more processors of the base station may be configured to:

start a timer upon sending the message to the wireless communication device; and upon expiry of the timer, cancel the authorization of the handover and release resources reserved for execution of the handover.

Alternatively or in addition, the one or more processors of the base station may be configured to:

via the radio interface, send a further message to the wireless communication device, the further message to the wireless communication device indicating cancellation of the authorization of the handover and instructing the wireless communication device to release resources reserved for the handover.

Further, the one or more processors of the base station may be configured to:

via the radio interface, send a further message to the wireless communication device, the further message to the wireless communication device instructing the wireless communication device to stop the sending of the at least one UL signal.

Further, the one or more processors of the base station may be configured to:

via the network interface, send a message to the at least one candidate base station, the message to the at least one candidate base station preparing the candidate base station to act as the target base station of the handover.

In this case, the message to the at least one candidate base station may indicate radio resources for monitoring the at least one UL signal.

Further, the message to the at least one candidate base station may indicate resources reserved for execution of the handover.

The one or more processors of the base station may then be configured to:

via the network interface, send a further message to the at least one candidate base station, the further message to the at least one candidate base station indicating cancellation of the authorization of the handover and instructing the candidate base station to release resources reserved for the handover.

Further, the one or more processors of the base station may be configured to:

via the radio interface, receive a report of measurements from the wireless communication device, the measurements being performed by the wireless communication device on DL reference signals received from the base station and the at least one candidate base station; and send the message to the wireless communication device in response to the report of the measurements performed by the wireless communication device.

According to a further embodiment, a base station is provided. The base station comprises a radio interface for connecting to a wireless communication device. Further, the base station comprises a network interface to other nodes of the wireless communication network. Further, the base station comprises one or more processors configured to:

via the network interface, receive a message preparing the base station to act as a target base station of a handover of a wireless communication device from another base station;

in response to the message, receive via the radio interface at least one UL signal from the wireless communication device and perform measurements based on the received at least one UL signal; and via the network interface send a report of the measurements to the other base station.

According to a further embodiment, a base station is provided. The base station comprises a radio interface for connecting to a wireless communication device. Further, the base station comprises a network interface to other nodes of the wireless communication network. Further, the base station comprises one or more processors configured to:

via the network interface, receive a message preparing the base station to act as a target base station of a handover of a wireless communication device from another base station;

start a timer upon receiving the message preparing the base station, and upon expiry of the timer, cancel authorization of the handover and release resources reserved for execution of the handover; and/or in response to receiving a further message, cancel authorization of the handover and releasing resources reserved for the handover.

The base station of the above-mentioned embodiments may be configured for use as one of the candidate base stations in the above-described methods.

The measurements may for example be channel quality measurements. However, the measurements could also involve detection of the UL signal, such as detection of a random access preamble or similar predefined signal sequence.

The one or more processors of the base station may be configured to:
send a message to the wireless communication device, the message to the wireless communication device triggering the handover. The message triggering the handover may also indicate that the base station was, based on the measurements, selected among multiple candidate base stations as the target base station of the handover.

The message preparing the base station may indicate radio resources for monitoring the at least one UL signal. Further, the message preparing the base station may indicate resources reserved for execution of the handover.

Further, the one or more processors of the base station may be configured to receive, via the network interface, a further message indicating cancellation of authorization of the handover and instructing the candidate base station to release resources reserved for the handover. Alternatively or in addition, the one or more processors may also be configured to start a timer upon receiving the message preparing the base station and release resources reserved for the handover upon expiry of the timer.

According to a further embodiment, a system is provided. The system comprises a wireless communication device configured to operate as described above. Further, the system comprises a base station configured to operate as described above for the source base station of the handover. Further, the system comprises a plurality of base stations configured to operate as described above for the candidate base stations.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to control of communication in a wireless communication network, in particular to control of a handover of a wireless communication device, in the following also referred to as UE, from a source base station to a target base station. By way of example, the wireless communication network may be based on the LTE radio technology specified by 3GPP or a 5G ($5^{th}$ Generation) radio technology, such as the NR (New Radio) technology currently developed by 3GPP. The wireless communication device may for example be a mobile phone, smartphone, tablet computer, wireless data modem, MTC (machine type communication) device, or other kinds of portable or stationary communication device.

Figure 1:
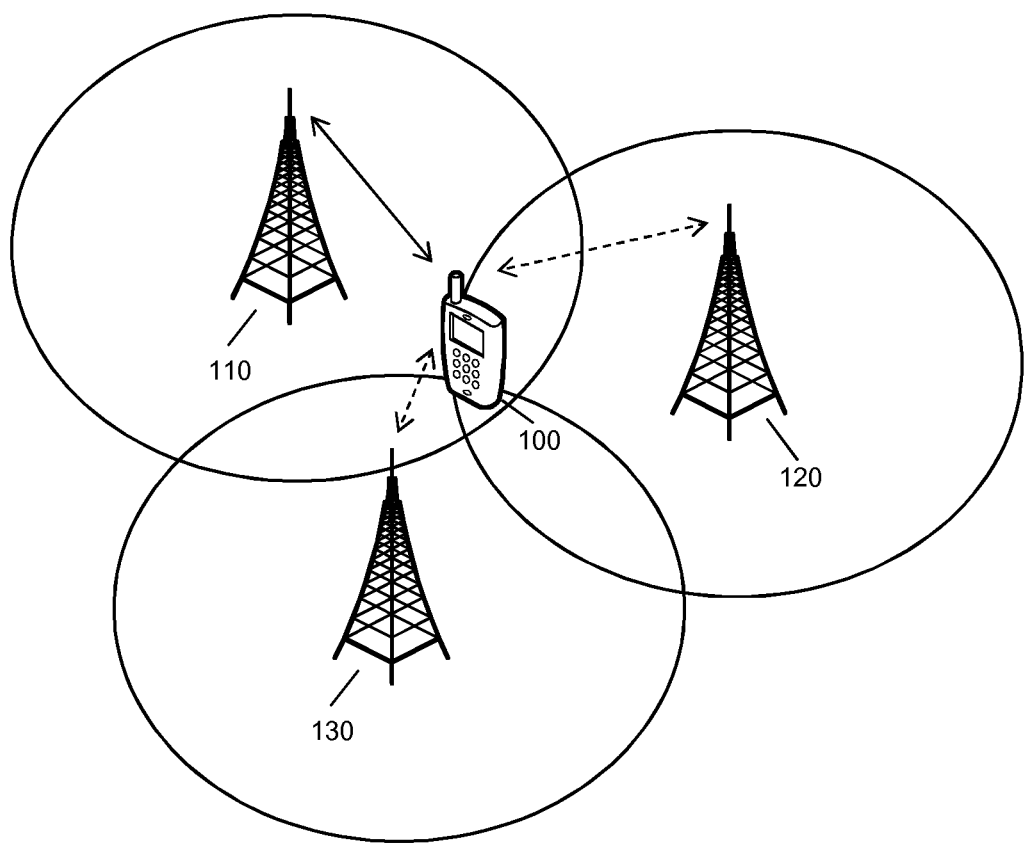
FIG. 1 schematically illustrates a wireless communication network system according to an embodiment of the invention.

FIG. 1 schematically illustrates an exemplary scenario in which a handover may be controlled in accordance with the concepts as illustrated herein. In particular, FIG. 1 shows a UE 100 and multiple base stations 110, 120, 130 of the wireless communication network. In the scenario of FIG. 1, the UE 100 is assumed to be connected to the base station 110, which may thus also termed as the serving base station of the UE 100. In this state, the base station 110 would responsible for handling transmission of user data to or from the UE 100. In addition, the base station would also be responsible for controlling the communication with the UE 100, e.g., by scheduling transmissions between the UE 100 and the wireless communication network or by procedures related to mobility of the UE 100 within a coverage area of the mobile communication network. One specific example of such procedure is a handover (HO) of the UE 100 from the base station 110 to another base station. In such HO, the base station would be the source base station, and the other base station would be the target base station. In the concepts as described herein, it is assumed that the HO is controlled on the basis of measurement of at least one UL signal transmitted by the UE 100. The UL signal may be measured by the base station 110, i.e., the source base station of the HO, and one or more other base stations which are suitable candidates to act as the target base station of the HO, such as one of the base stations 120, 130. The UL signal may be an UL reference signal, and the base station(s) may perform channel quality measurements on the UL reference signal. Based on the channel quality measurements performed on the UL reference signal(s), the target base station of the HO may be selected among the candidate base stations and the HO may be triggered. However, it is also noted that in some situations, the base station 110 could decide to refrain from executing the HO, e.g., because based on the channel quality measurements on the UL reference signal the base station 110 is found to be still the best choice for serving the UE 100. It is noted that as an alternative or in addition to channel quality measurements, other types of measurements may be used as well, e.g., measurements to detect the UL signal transmitted by the UE 100. For example, the UL signal could include a random access preamble or similar predefined signal sequence transmitted by the UE 100, and the measurements by the base station(s) could involve detection of this signal sequence.

For enabling the measurements on the UL signal(s), the base station 110 prepares the HO by sending a message to the UE 100 which indicates authorization of the HO and instructs the UE 100 to start sending the UL signal(s) and also sends messages to the candidate base stations to instruct the candidate base stations to measure the UL signal(s) and report the measurements to the base station 110. Further, the base station 110 may also decide to cancel authorization of the HO and send corresponding messages to the UE 100 and to the candidate base stations.

Figure 2:
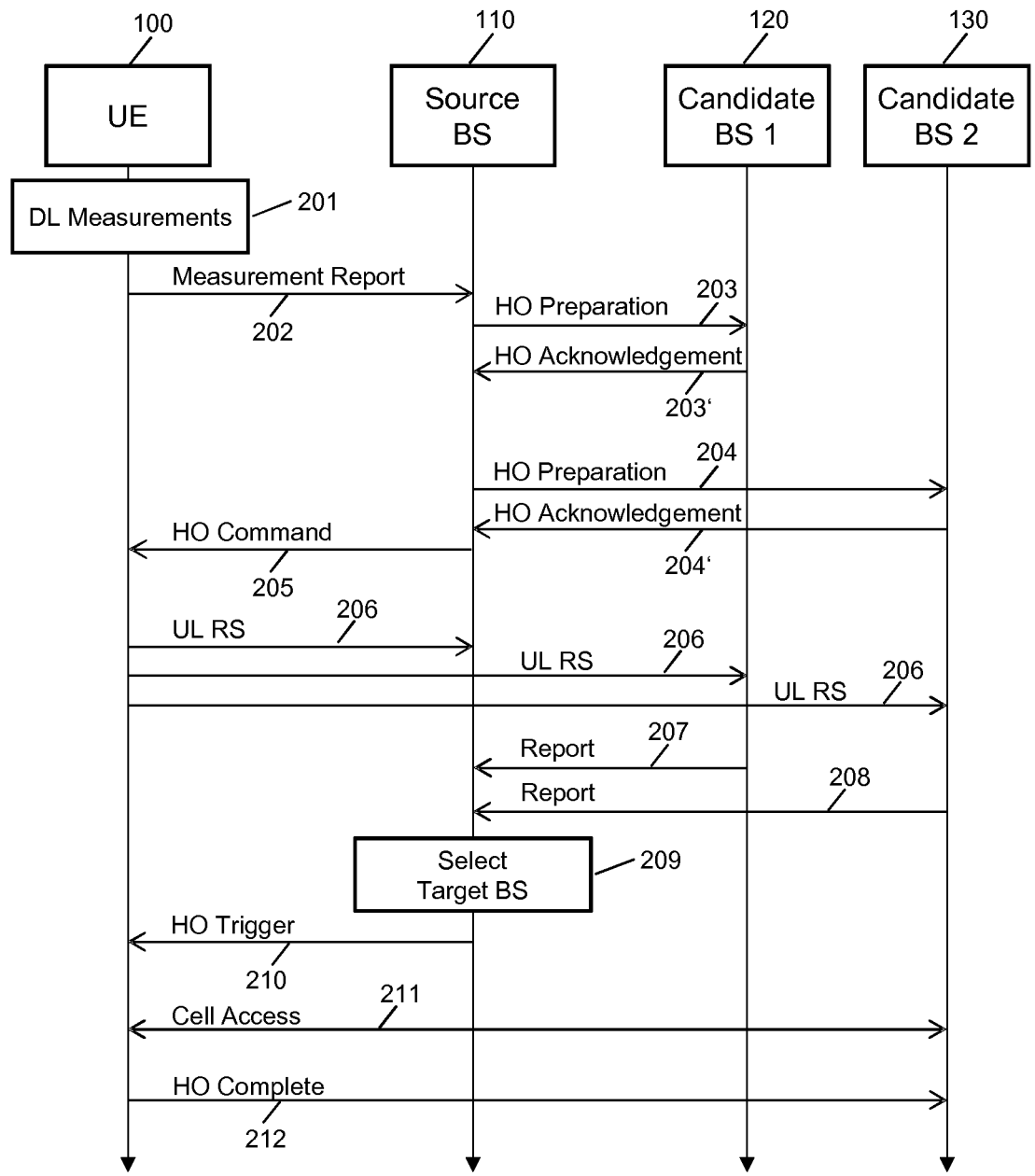
FIG. 2 shows an example of processes according to an embodiment of the invention.

FIG. 2 shows an example of processes which are based on the concepts as outlined above. The processes of FIG. 2 involve the UE 100 and the base stations 110, 120, 130. Specifically, the processes of FIG. 2 relate to control of a HO from the base station 110, thus designated as source base station (source BS), to one of the base stations 120, 130, thus designated as first candidate base station (candidate BS 1) and second candidate base station (candidate BS 2), respectively.

As illustrated by block 201, the UE 100 may initially perform measurements on DL reference signals transmitted by the base stations 110, 120, 130. These measurements may for example aim at evaluating a channel quality, e.g., in terms of RSRP (Reference Signal Received Power) or RSRQ (Reference Signal Received Quality). In response to the measurements meeting a certain trigger criterion, such as the measured channel quality for one of the base stations 120, 130 becoming higher than the measured channel quality for the base station 110, the UE 100 sends a measurement report 202 to the base station 110. Based on the measurement report 202, the base station then decides to authorize a HO of the UE 100. In this HO, the base station 110 is the source base station 110. However, rather than determining a unique target base station of the HO, the base station 110 merely determines a set of candidate base stations, which may become the target base station of the HO. This preselection may be performed on the basis of the measurement report 202. However, other information may be utilized in addition or as an alternative, such as information on a movement state of the UE 100 (e.g., by considering the speed at which the UE 100 moves, its movement direction, or the like). In the example of FIG. 2, it is assumed that the base stations 120, 130 are selected as the candidate base stations.

As further illustrated, the source base station 110 then prepares the candidate base stations 120, 130 for the HO. For the candidate base station 120, this is accomplished by sending an HO preparation message 203 to the candidate base station 120, and for the candidate base station 130, this is accomplished by sending an HO preparation message 204 to the candidate base station 130. The HO preparation message 203, 204 instructs the candidate base station 120, 130 to perform channel quality measurements on an UL reference signal transmitted by the UE 100 and to report these channel quality measurements to the source base station 110. The HO preparation message 203, 204 may indicate the identity of the UE 100. Further, the HO preparation message 203, 204 may indicate information on the UL reference signal to be measured, e.g., in terms of radio resources assigned for transmission of the UL reference signal, e.g., in terms of subband, frequency, or frequency hopping pattern, in terms of a repetition pattern for transmission of the UL reference signal, or in terms of a UE specific sequence included in the UL reference signal. The UL reference signal may for example be based on a Zadoff-Chu sequence. Further, the HO preparation message 203, 204 may also indicate resources reserved for execution of the HO, such as a random access preamble to be used by the UE 100 when accessing the cell of the target base station. Alternatively or in addition, the candidate base station 120, 130 may determine resources reserved for the HO, such as a random access preamble to be used by the UE 100 when accessing the cell of the candidate base station 120, 130, and indicate the reserved resources to the source base station 110, e.g., in a response to the HO preparation message 203, 204, as illustrated by HO acknowledgement messages 203' and 204'.

As further illustrated, the source base station 110 sends an HO command 205 to the UE 100. This HO command 205 does not immediately trigger the HO, but merely indicates authorization of the HO to the UE 100. Actual triggering of the HO may occur at a later time. Further, in some cases authorization of the HO may be cancelled already before the HO is triggered. The HO command 205 is thus sent before selecting the actual target base station of the HO and before actually triggering the HO.

The HO command 205 instructs the UE 100 to send the UL reference signal. The HO command 205 may indicate information on the UL reference signal to be sent by the UE 100, e.g., in terms of the radio resources assigned for transmission of the UL reference signal, in terms of a repetition pattern for transmission of the UL reference signal, or in terms of a UE specific sequence included in the UL reference signal, e.g., a specific Zadoff-Chu sequence. Further, the HO command 205 may also indicate resources reserved for execution of the HO, such as a random access preamble to be used by the UE 100 when accessing the cell of the target base station.

In response to receiving the HO command 205, the UE 100 proceeds by sending the UL reference signal, as illustrated by 206. Here, it is noted that the UE 100 may send one UL reference signal, which is receivable by the source base station 110 and the candidate base stations 120, 130. However, it is also conceivable that the UE 100 sends different UL reference signals to at least some of these base stations 110, 120, 130. The UL reference signal 206 is received by the base stations 110, 120, 130 and in each case used for measuring a channel quality between the UE 100 and the respective base station 110, 120, 130. For example, the channel quality could be measured in terms of an RSRP or RSRQ.

As further illustrated, each of the candidate base stations 120, 130 then sends a report of the measured channel quality to the source base station 110. Based on the measured channel qualities, the source base station 110 then controls the HO. As illustrated by block 209, this involves selection of a target base station on the candidate base stations 120, 130. In the example of FIG. 2, it is assumed that the second candidate base station 130 is selected as the target base station of the HO. Further, the source base station 110 may decide based on the channel quality measurements whether and when to actually trigger the HO. In the example of FIG. 2, it is assumed that the source base station 110 triggers the HO to the selected target base station by sending an HO trigger message 210 to the UE 100. The HO trigger message 210 may indicate the selected target base station and instructs the UE 100 to execute the HO by accessing the cell of the selected target base station, as illustrated by 211. Having successfully gained access to the cell of the selected target base station, the UE 100 may confirm execution of the HO by sending an HO complete message 212 to its new serving base station, in the illustrated example the base station 130. From then on, the base station 130 will handle transmission of user data to or from the UE 100 and/or be responsible for controlling the communication with the UE 100.

Figure 3:
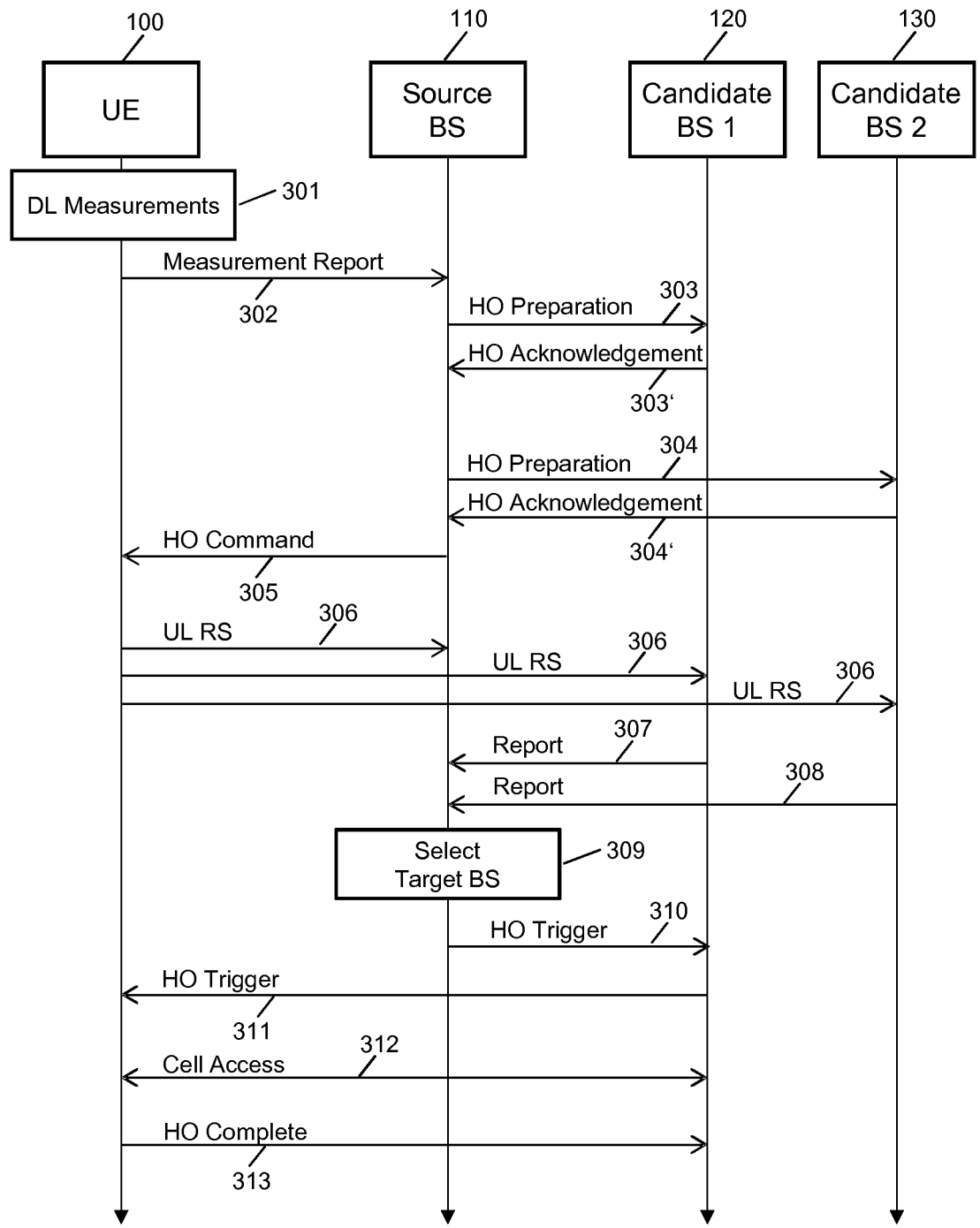
FIG. 3 shows a further example of processes according to an embodiment of the invention.

FIG. 3 shows a further example of processes which are based on the concepts as outlined above. The processes of FIG. 3 involve the UE 100 and the base stations 110, 120, 130. Similar to the processes of FIG. 2, the processes of FIG. 3 relate to control of a HO from the base station 110, thus designated as source base station (source BS), to one of the base stations 120, 130, thus designated as first candidate base station (candidate BS 1) and second candidate base station (candidate BS 2), respectively.

As illustrated by block 301, the UE 100 may initially perform measurements on DL reference signals transmitted by the base stations 110, 120, 130. These measurements may for example aim at evaluating a channel quality, e.g., in terms of RSRP or RSRQ. In response to the measurements meeting a certain trigger criterion, such as the measured channel quality for one of the base stations 120, 130 becoming higher than the measured channel quality for the base station 110, the UE 100 sends a measurement report 302 to the base station 110. Based on the measurement report 302, the base station then decides to authorize a HO of the UE 100. In this HO, the base station 110 is the source base station 110. Further, the base station 110 determines a set of candidate base stations, which may become the target base station of the HO. This pre-selection may be performed on the basis of the measurement report 302. However, other information may be utilized in addition or as an alternative, such as information on a movement state of the UE 100 (e.g., by considering the speed at which the UE 100 moves, its movement direction, or the like). In the example of FIG. 3, it is assumed that the base stations 120, 130 are selected as the candidate base stations.

As further illustrated, the source base station 110 then prepares the candidate base stations 120, 130 for the HO. For the candidate base station 120, this is accomplished by sending an HO preparation message 303 to the candidate base station 120, and for the candidate base station 130, this is accomplished by sending an HO preparation message 304 to the candidate base station 130. The HO preparation message 303, 304 instructs the candidate base station 120, 130 to perform channel quality measurements on an UL reference signal transmitted by the UE 100 and to report these channel quality measurements to the source base station 110. The HO preparation message 303, 304 may indicate the identity of the UE 100. Further, the HO preparation message 303, 304 may indicate information on the UL reference signal to be measured, e.g., in terms of radio resources assigned for transmission of the UL reference signal, e.g., in terms of subband, frequency, or frequency hopping pattern, in terms of a repetition pattern for transmission of the UL reference signal, or in terms of a UE specific sequence included in the UL reference signal. The UL reference signal may for example be based on a Zadoff-Chu sequence. Further, the HO preparation message 303, 304 may also indicate resources reserved for execution of the HO, such as a random access preamble to be used by the UE 100 when accessing the cell of the target base station. Alternatively or in addition, the candidate base station 120, 130 may determine resources reserved for the HO, such as a random access preamble to be used by the UE 100 when accessing the cell of the candidate base station 120, 130, and indicate the reserved resources to the source base station 110, e.g., in a response to the HO preparation message 303, 304, as illustrated by HO acknowledgement messages 303' and 304'.

As further illustrated, the source base station 110 sends an HO command 305 to the UE 100. This HO command 305 does not immediately trigger the HO, but merely indicates authorization of the HO to the UE 100. Actual triggering of the HO may occur at a later time. Further, in some cases authorization of the HO may be cancelled already before the HO is triggered. The HO command 305 is thus sent before selecting the actual target base station of the HO and before actually triggering the HO.

The HO command 305 instructs the UE 100 to send the UL reference signal. The HO command 305 may indicate information on the UL reference signal to be sent by the UE 100, e.g., in terms of the radio resources assigned for transmission of the UL reference signal, in terms of a repetition pattern for transmission of the UL reference signal, or in terms of a UE specific sequence included in the UL reference signal, e.g., a specific Zadoff-Chu sequence. Further, the HO command 305 may also indicate resources reserved for execution of the HO, such as a random access preamble to be used by the UE 100 when accessing the cell of the target base station.

In response to receiving the HO command 305, the UE 100 proceeds by sending the UL reference signal, as illustrated by 306. Here, it is noted that the UE 100 may send one UL reference signal, which is receivable by the source base station 110 and the candidate base stations 120, 130. However, it is also conceivable that the UE 100 sends different UL reference signals to at least some of these base stations 110, 120, 130. The UL reference signal 306 is received by the base stations 110, 120, 130 and in each case used for measuring a channel quality between the UE 100 and the respective base station 110, 120, 130. For example, the channel quality could be measured in terms of an RSRP or RSRQ.

As further illustrated, each of the candidate base stations 120, 130 then sends a report of the measured channel quality to the source base station 110. Based on the measured channel qualities, the source base station 110 then controls the HO. As illustrated by block 309, this involves selection of a target base station on the candidate base stations 120, 130. In the example of FIG. 3, it is assumed that the first candidate base station 120 is selected as the target base station of the HO. Further, the source base station 110 may decide based on the channel quality measurements whether and when to actually trigger the HO. In the example of FIG. 3, it is assumed that the UE 100 has already moved too far out of coverage of the source base station 110, so that triggering of the HO directly via a radio link between the source base station 110 and the UE 100 would be unreliable. The source base station could for example detect the presence of such situation on the basis of the channel quality measurements performed on the UL reference signal. To achieve sufficient reliability, the source base station 110 triggers the HO to the selected target base station by sending an HO trigger message 310 to the selected target base station, i.e., to the base station 120. The message 310 may at the same time inform the base station 120 that it was selected as the target base station of the HO. The base station 120 then forwards the HO trigger message 311 to the UE 100. The HO trigger message 310, 311 may indicate the selected target base station and instructs the UE 100 to execute the HO by accessing the cell of the selected target base station, as illustrated by 312. Having successfully gained access to the cell of the selected target base station, the UE 100 may confirm execution of the HO by sending an HO complete message 313 to its new serving base station, in the illustrated example the base station 120. From then on, the base station 120 will handle transmission of user data to or from the UE 100 and/or be responsible for controlling the communication with the UE 100.

It is noted that the direct sending of the HO trigger message in the process of FIG. 2 could also be combined with the indirect sending of the HO trigger message in the process of FIG. 3, e.g., by performing the indirect sending of the HO trigger message in addition to the direct sending of the HO trigger message.

Figure 4:
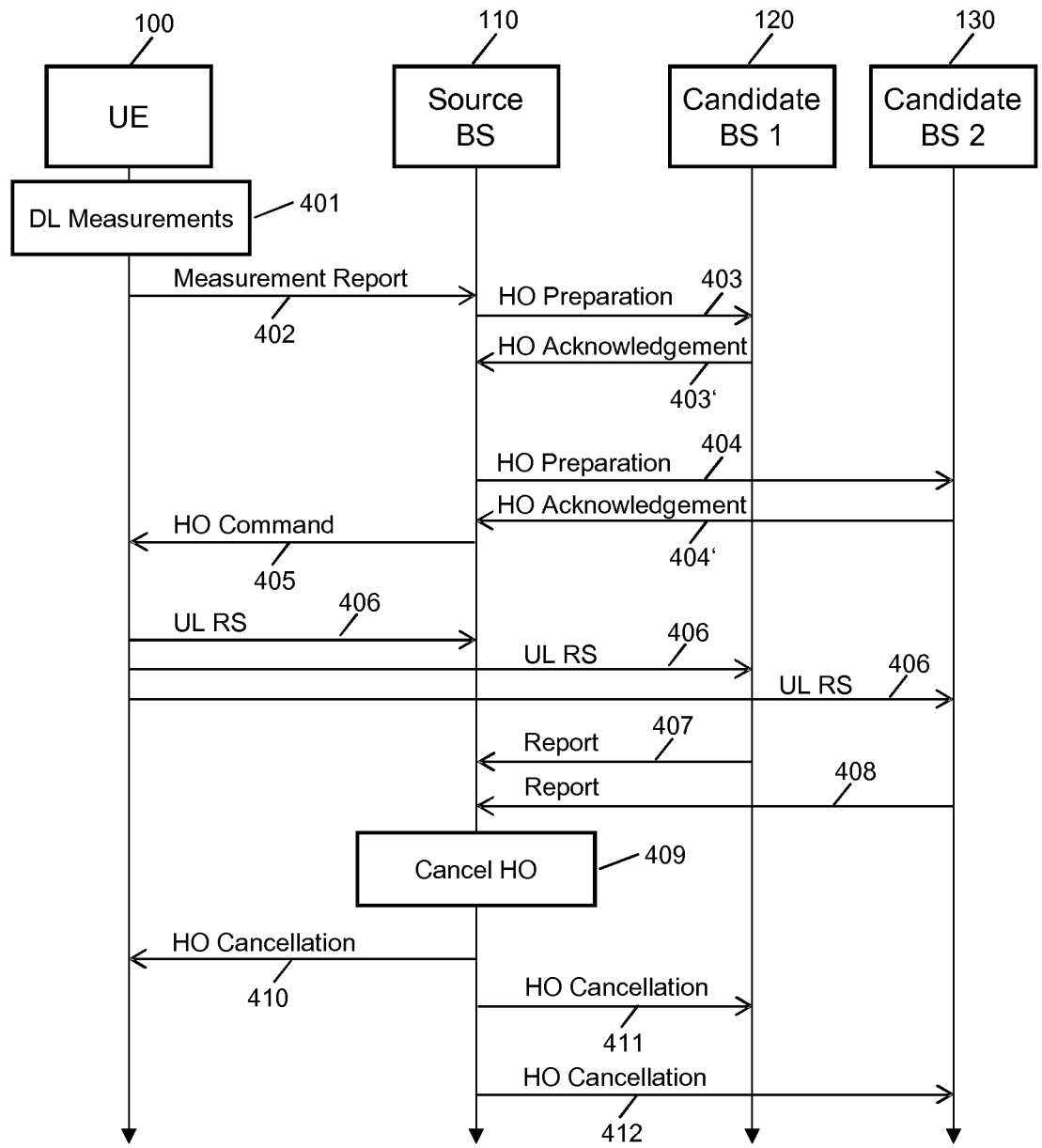
FIG. 4 shows a further example of processes according to an embodiment of the invention.

FIG. 4 shows a further example of processes which are based on the concepts as outlined above. The processes of FIG. 4 involve the UE 100 and the base stations 110, 120, 130. Similar to the processes of FIGS. 2 and 3, the processes of FIG. 4 relate to control of a HO from the base station 110, thus designated as source base station (source BS), to one of the base stations 120, 130, thus designated as first candidate base station (candidate BS 1) and second candidate base station (candidate BS 2), respectively.

As illustrated by block 401, the UE 100 may initially perform measurements on DL reference signals transmitted by the base stations 110, 120, 130. These measurements may for example aim at evaluating a channel quality, e.g., in terms of RSRP or RSRQ. In response to the measurements meeting a certain trigger criterion, such as the measured channel quality for one of the base stations 120, 130 becoming higher than the measured channel quality for the base station 110, the UE 100 sends a measurement report 402 to the base station 110. Based on the measurement report 402, the base station then decides to authorize a HO of the UE 100. In this HO, the base station 110 is the source base station 110. Further, the base station 110 determines a set of candidate base stations, which may become the target base station of the HO. This pre-selection may be performed on the basis of the measurement report 402. However, other information may be utilized in addition or as an alternative, such as information on a movement state of the UE 100 (e.g., by considering the speed at which the UE 100 moves, its movement direction, or the like). In the example of FIG. 4, it is assumed that the base stations 120, 130 are selected as the candidate base stations.

As further illustrated, the source base station 110 then prepares the candidate base stations 120, 130 for the HO. For the candidate base station 120, this is accomplished by sending an HO preparation message 403 to the candidate base station 120, and for the candidate base station 130, this is accomplished by sending an HO preparation message 404 to the candidate base station 130. The HO preparation message 403, 404 instructs the candidate base station 120, 130 to perform channel quality measurements on an UL reference signal transmitted by the UE 100 and to report these channel quality measurements to the source base station 110. The HO preparation message 403, 404 may indicate the identity of the UE 100. Further, the HO preparation message 403, 404 may indicate information on the UL reference signal to be measured, e.g., in terms of radio resources assigned for transmission of the UL reference signal, e.g., in terms of subband, frequency, or frequency hopping pattern, in terms of a repetition pattern for transmission of the UL reference signal, or in terms of a UE specific sequence included in the UL reference signal. The UL reference signal may for example be based on a Zadoff-Chu sequence. Further, the HO preparation message 403, 404 may also indicate resources reserved for execution of the HO, such as a random access preamble to be used by the UE 100 when accessing the cell of the target base station. Alternatively or in addition, the candidate base station 120, 130 may determine resources reserved for the HO, such as a random access preamble to be used by the UE 100 when accessing the cell of the candidate base station 120, 130, and indicate the reserved resources to the source base station 110, e.g., in a response to the HO preparation message 403, 404, as illustrated by HO acknowledgement messages 403' and 404'.

As further illustrated, the source base station 110 sends an HO command 405 to the UE 100. This HO command 405 does not immediately trigger the HO, but merely indicates authorization of the HO to the UE 100. Actual triggering of the HO may occur at a later time. Further, in some cases authorization of the HO may be cancelled already before the HO is triggered. The HO command 405 is thus sent before selecting the actual target base station of the HO and before actually triggering the HO.

The HO command 405 instructs the UE 100 to send the UL reference signal. The HO command 405 may indicate information on the UL reference signal to be sent by the UE 100, e.g., in terms of the radio resources assigned for transmission of the UL reference signal, in terms of a repetition pattern for transmission of the UL reference signal, or in terms of a UE specific sequence included in the UL reference signal, e.g., a specific Zadoff-Chu sequence. Further, the HO command 405 may also indicate resources reserved for execution of the HO, such as a random access preamble to be used by the UE 100 when accessing the cell of the target base station.

In response to receiving the HO command 405, the UE 100 proceeds by sending the UL reference signal, as illustrated by 406. Here, it is noted that the UE 100 may send one UL reference signal, which is receivable by the source base station 110 and the candidate base stations 120, 130. However, it is also conceivable that the UE 100 sends different UL reference signals to at least some of these base stations 110, 120, 130. The UL reference signal 406 is received by the base stations 110, 120, 130 and in each case used for measuring a channel quality between the UE 100 and the respective base station 110, 120, 130. For example, the channel quality could be measured in terms of an RSRP or RSRQ.

As further illustrated, each of the candidate base stations 120, 130 then sends a report of the measured channel quality to the source base station 110. Based on the measured channel qualities, the source base station 110 then controls the HO. In the example of FIG. 4, it is assumed that the source base station 110 decides to cancel the HO, as illustrated by block 409. For example, source base station 110 may take this decision because the source base station 110 is found to be still the best choice for serving the UE 100 and/or because the UE 100 is found to be substantially stationary. The source base station 110 this proceeds by sending an HO cancellation message 410 to the UE 100, by sending an HO cancellation message 411 to the candidate base station 120, and by sending an HO cancellation message 412 to the candidate base station 130. In response to receiving the HO cancellation message 410, the UE 100 stops sending the UL reference signal and releases the resources reserved for execution of the HO. Accordingly, a random access preamble assigned to the UE 100 for purposes of executing the HO may then become available again. Similarly, the candidate base station 120, 130 stop measuring the UL reference signal release the resources reserved for execution of the HO in response to receiving their respective HO cancellation message 411, 412.

It is noted that in some scenarios releasing stopping of the transmission of the UL reference signal, stopping the measuring of the UL reference signal, and/or releasing of the resources reserved for execution of the HO could in addition or alternatively be triggered by expiry of a timer. An example of corresponding processes is illustrated in FIG. 5.

Figure 5:
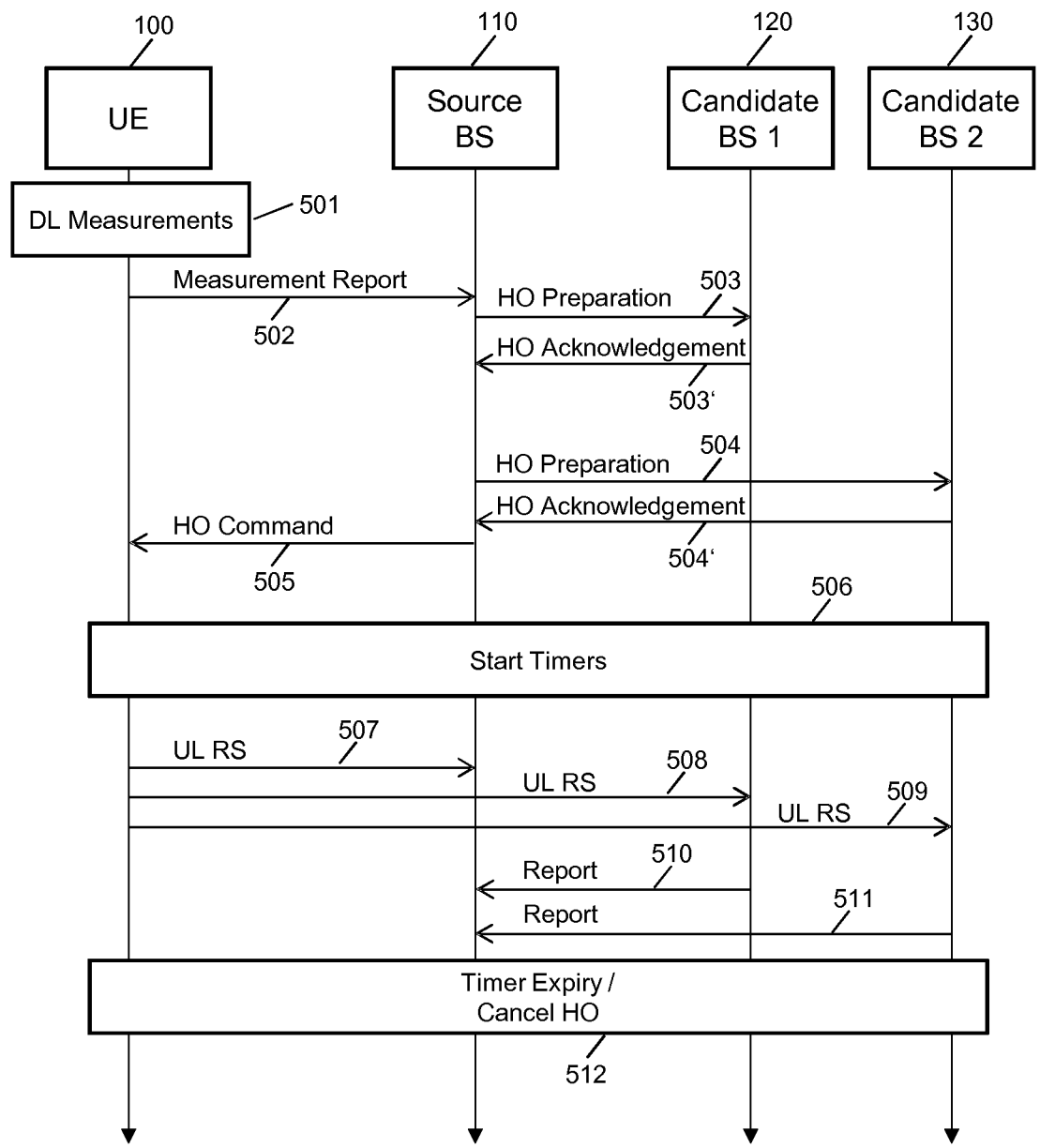
FIG. 5 shows a further example of processes according to an embodiment of the invention.

The processes of FIG. 5 involve the UE 100 and the base stations 110, 120, 130. Similar to the processes of FIGS. 2, 3, and 4, the processes of FIG. 5 relate to control of a HO from the base station 110, thus designated as source base station (source BS), to one of the base stations 120, 130, thus designated as first candidate base station (candidate BS 1) and second candidate base station (candidate BS 2), respectively.

As illustrated by block 501, the UE 100 may initially perform measurements on DL reference signals transmitted by the base stations 110, 120, 130. These measurements may for example aim at evaluating a channel quality, e.g., in terms of RSRP or RSRQ. In response to the measurements meeting a certain trigger criterion, such as the measured channel quality for one of the base stations 120, 130 becoming higher than the measured channel quality for the base station 110, the UE 100 sends a measurement report 502 to the base station 110. Based on the measurement report 502, the base station then decides to authorize a HO of the UE 100. In this HO, the base station 110 is the source base station 110. Further, the base station 110 determines a set of candidate base stations, which may become the target base station of the HO. This pre-selection may be performed on the basis of the measurement report 502. However, other information may be utilized in addition or as an alternative, such as information on a movement state of the UE 100 (e.g., by considering the speed at which the UE 100 moves, its movement direction, or the like). In the example of FIG. 5, it is assumed that the base stations 120, 130 are selected as the candidate base stations.

As further illustrated, the source base station 110 then prepares the candidate base stations 120, 130 for the HO. For the candidate base station 120, this is accomplished by sending an HO preparation message 503 to the candidate base station 120, and for the candidate base station 130, this is accomplished by sending an HO preparation message 504 to the candidate base station 130. The HO preparation message 503, 504 instructs the candidate base station 120, 130 to perform channel quality measurements on an UL reference signal transmitted by the UE 100 and to report these channel quality measurements to the source base station 110. The HO preparation message 503, 504 may indicate the identity of the UE 100. Further, the HO preparation message 503, 504 may indicate information on the UL reference signal to be measured, e.g., in terms of radio resources assigned for transmission of the UL reference signal, e.g., in terms of subband, frequency, or frequency hopping pattern, in terms of a repetition pattern for transmission of the UL reference signal, or in terms of a UE specific sequence included in the UL reference signal. The UL reference signal may for example be based on a Zadoff-Chu sequence. Further, the HO preparation message 503, 504 may also indicate resources reserved for execution of the HO, such as a random access preamble to be used by the UE 100 when accessing the cell of the target base station. Alternatively or in addition, the candidate base station 120, 130 may determine resources reserved for the HO, such as a random access preamble to be used by the UE 100 when accessing the cell of the candidate base station 120, 130, and indicate the reserved resources to the source base station 110, e.g., in a response to the HO preparation message 503, 504, as illustrated by HO acknowledgement messages 503' and 504'.

As further illustrated, the source base station 110 sends an HO command 505 to the UE 100. This HO command 505 does not immediately trigger the HO, but merely indicates authorization of the HO to the UE 100. Actual triggering of the HO may occur at a later time. Further, in some cases authorization of the HO may be cancelled already before the HO is triggered. The HO command 505 is thus sent before selecting the actual target base station of the HO and before actually triggering the HO.

The HO command 505 instructs the UE 100 to send the UL reference signal. The HO command 505 may indicate information on the UL reference signal to be sent by the UE 100, e.g., in terms of the radio resources assigned for transmission of the UL reference signal, in terms of a repetition pattern for transmission of the UL reference signal, or in terms of a UE specific sequence included in the UL reference signal, e.g., a specific Zadoff-Chu sequence. Further, the HO command 505 may also indicate resources reserved for execution of the HO, such as a random access preamble to be used by the UE 100 when accessing the cell of the target base station.

In response to transmission of the HO command 505 and preparation of the candidate base stations 120, 130, a respective timer is started at the UE 100, the source base station 110, and each of the candidate base stations 120, 130, as indicated by block 506.

In response to receiving the HO command 505, the UE 100 also proceeds by sending the UL reference signal, as illustrated by 507, 508, 509. Here, it is noted that the UE 100 may send one UL reference signal, which is receivable by the source base station 110 and the candidate base stations 120, 130. However, it is also conceivable that the UE 100 sends different UL reference signals to at least some of these base stations 110, 120, 130. The UL reference signal 507, 508, 509 is received by the base stations 110, 120, 130 and in each case used for measuring a channel quality between the UE 100 and the respective base station 110, 120, 130. For example, the channel quality could be measured in terms of an RSRP or RSRQ.

As further illustrated, each of the candidate base stations 120, 130 then sends a report of the measured channel quality to the source base station 110. Based on the measured channel qualities, the source base station 110 then controls the HO. In the example of FIG. 5, it is assumed that the source base station 110 does not decide to trigger the HO. Rather, as illustrated by block 512, the timers started at the UE 100, the source base station 110, and the candidate base stations 120, 130 expire, and in response to the expiry of the timers the HO is cancelled. The resources reserved for the HO may then be released and used for other purposes.

In the case of the UE 100, the timer could be started upon receiving the HO command 505. In the case of the candidate base stations 120, 130, the timer could be started upon receiving the HO preparation message 503, 504. In the case of the source base station 110, the timer could be started upon sending the HO command 505. The timers in the UE 100, the source base station 110, and the candidate base stations 120, 130 may be coordinated in various ways. For example, start values of the timers could be preconfigured based on standardization or operator settings. Further, start values of the timers could be set by the base stations. For example, the start values of the timers could be set by the source base station 110 and indicated to the UE 100 in the HO command 505 and indicated to the candidate base stations 120, 130 in the HO preparation message 503, 504. In some cases the candidate base stations 120, 130 may be responsible for determining and managing some of the resources reserved for the HO. In this case, the candidate base stations 120, 130 may also set the start value of the timer and may also indicate the start value of the timer to the source base station 110. If releasing of resources reserved for the HO is triggered by expiry of a timer at the candidate base station 120, 130, the candidate base station 120, 130 may also indicate this by sending a corresponding message to the source base station 110. The source base station 110 may then decide whether to cancel authorization of the HO and also indicate the cancellation to the UE 100 and/or to other candidate base stations, similar to the processes of FIG. 4. Accordingly, messages indicating cancellation of the HO, e.g., like used in the example of FIG. 4, may also be used in combination with timers like in the example of FIG. 5. Further, it is noted that while in the example of FIG. 5 a respective timer is started in the UE 100, the source base station 110, and the candidate base stations 120, 130, modified processes could use a timer in only a subset of one or more of these devices, and expiry of the timer and cancellation of the HO then be indicated by messages to the other devices.

Further, the cancellation of the previously prepared HO could also be accomplished only in part, e.g., by removing a candidate base station from the set of candidate base stations by adding a new candidate base station to the set of candidate base stations. The HO cancellation messages could then be used for conveying correspondingly updated information to the UE 100 and to the candidate base stations.

Further, it is noted that while in the examples of FIGS. 2, 3, 4, and 5 measurements performed by the source base station 110 and by each of the candidate base stations 120, 130 are used in combination for controlling the HO, alternative processes may base the control on only some of these measurements, e.g., a measurement by one of the candidate base stations.

Moreover, it is noted that cancellation of a previously authorized but not yet executed HO as explained in connection with the examples of FIGS. 4 and 5 is not only applicable in connection with control of the HO on the basis of UL signals, but also in connection with other mechanisms of controlling the HO. For example, rather than controlling the selection of the target base station and/or triggering the HO on the basis of measurements on UL signals, the previously authorized HO could be controlled on the basis of measurements on DL signals performed by the UE 100. For example, the UE 100 could measure DL reference signals from the source base station 110 and from the candidate base stations 120, 130, and on the basis of these measurements autonomously select the target base station of the HO and/or decide whether and/or when to trigger the HO.

Figure 6:
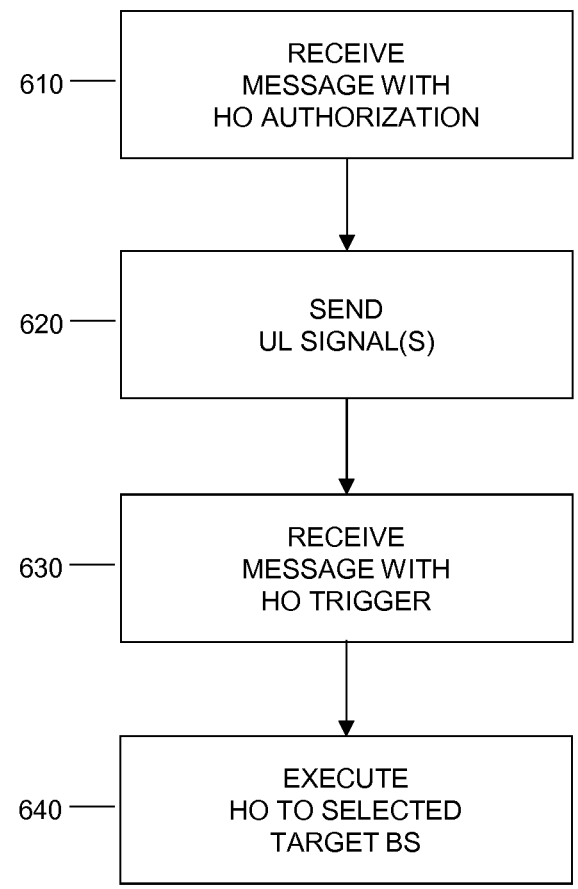
FIG. 6 shows a flowchart for illustrating a method according to an embodiment of the invention.

FIG. 6 shows a flowchart illustrating a method of controlling communication in a wireless communication network, by which a wireless communication device, e.g., the above-mentioned UE 100, may implement concepts as described above. Specifically, the method may be used for controlling an HO of the wireless communication device from a source base station to a target base station on the basis of at least one UL signal transmitted by the wireless communication device. The at least one UL signal may include at least one UL reference signal and/or at least one random access preamble or similar predefined signal sequence. In some scenarios, the HO may be controlled on the basis of multiple UL signals transmitted by the wireless communication device, e.g., cell-specific UL reference signals which differ from base station to base station. If a processor based implementation of the wireless communication device is utilized, at least a part of the steps of the method may be performed and/or controlled by one or more processors of the wireless communication device.

At step 610, the wireless communication device receives a message from a base station, e.g., the base station 110. This base station may be the current serving base station of the wireless communication device and thus correspond to the source base station of the HO. In the following the base station will thus also referred to as source base station. The message indicates authorization of the HO of the wireless communication device from the source base station to at least one candidate base station which is prepared to act as the target base station of the HO, such as the above-mentioned base stations 120, 130. In some scenarios, the message may indicate authorization of the HO to a plurality of candidate base stations, from which the target base station is then selected. An example of such message is the above-mentioned message 205 or 305.

In some scenarios, the wireless communication device performs measurements, e.g., channel quality measurements, on DL reference signals received from the source base station and the at least one candidate base station and sends a report of the measurements to the source base station. The wireless communication device may then receive the message of step 610 in response to the report sent to the source base station. However, other criteria could be applied alternatively or in addition for initiating reception of the message of step 610.

The message of step 610 may indicate a configuration to be applied by the wireless communication device for sending the at least one UL signal. For example, the message of step 510 may indicate radio resources for sending the at least one UL signal.

The message of step 610 may also indicate resources reserved for the HO. For example, the message can indicate a signature sequence to be used by the wireless communication device for a random access procedure for accessing a cell of the target base station of the HO, e.g., a random access preamble.

At step 620, the wireless communication device sends the at least one UL signal. The sending of the at least one UL signal is performed in response to the message received at step 610. The at least one UL signal is configured to be usable for measurements by the source base station and/or the at least one candidate base station, e.g., for channel quality measurements or for measurements involving detection of the at least one UL signal. The measurements based on the UL signal may then be used as a basis for controlling the HO, e.g., by selecting the target base station of the HO on the candidate base stations, or by determining whether or when to trigger the HO.

If the HO is triggered based on the measurements, the wireless communication device may receive a further message at step 630. An example of such further message is the above-mentioned message 210 or 311. The further message triggers the HO and may also indicate the candidate base station, which based on the measurements was selected among multiple candidate base stations as the target base station of the HO. The further message may be received from the source base station. However, the further message may be received from a candidate base station, e.g., the candidate base station selected as the target base station.

At step 640, the wireless communication device may then execute the HO to the selected target base station, e.g., by accessing the cell of the target base station based on information received in the message of step 610.

In some scenarios, the wireless communication device may start a timer upon receiving the message of step 610. Upon expiry of the timer, the wireless communication device may stop sending of the UL signal. Upon expiry of a timer started upon receiving the message of step 610, the wireless communication device may also cancel the authorization of the HO and release resources reserved for the HO.

In some scenarios, the wireless communication device receives a further message from the source base station. In response to receiving the further message from the base station, the wireless communication device cancels the authorization of the HO and releases resources reserved for the handover. In response to receiving the further message from the source base station, the wireless communication device may also stop the sending of the UL signal. An example of such further message is the above-mentioned message 410.

Figure 7:
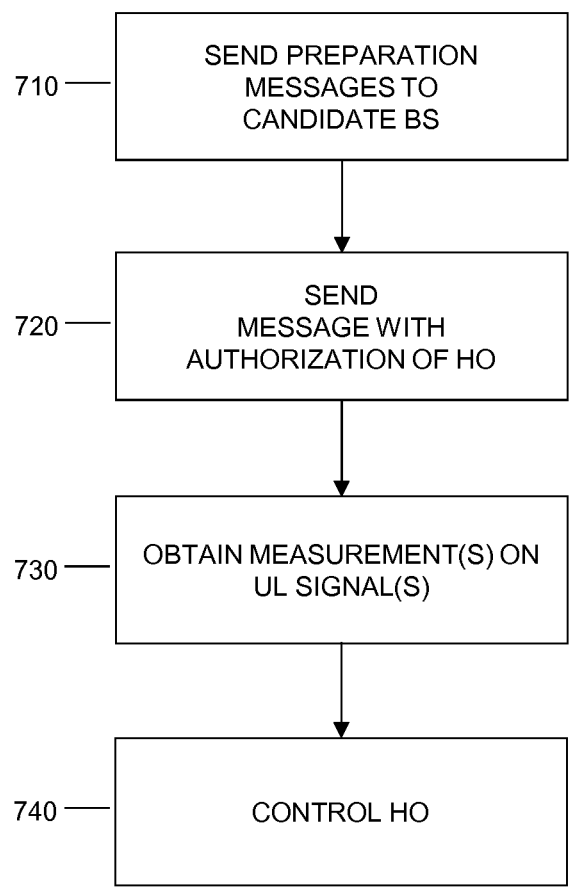
FIG. 7 shows a flowchart for illustrating a further method according to an embodiment of the invention.

FIG. 7 shows a flowchart illustrating a method of controlling communication in a wireless communication network, by which a base station of the wireless communication network, e.g., the above-mentioned base station 110, may implement concepts as described above. Specifically, the method may be used for controlling the base station to operate as a source base station of an HO of a wireless communication device, e.g., the above-mentioned UE 100, to a target base station, and to control the HO on the basis of at least one UL signal transmitted by the wireless communication device. The at least one UL signal may include at least one UL reference signal and/or at least one random access preamble or similar predefined signal sequence. The base station will in the following thus also be referred to as source base station. In some scenarios, the HO may be controlled on the basis of multiple UL signals transmitted by the wireless communication device, e.g., cell-specific UL reference signals which differ from base station to base station. If a processor based implementation of the base station is utilized, at least a part of the steps of the method may be performed and/or controlled by one or more processors of the base station.

At step 710, the source base station may prepare candidate base stations of the HO, such as the above-mentioned base stations 120, 130. This is accomplished by sending a message to each candidate base station. The message to the respective candidate base station prepares the candidate base station to act as the target base station of the HO. Examples of such messages are the above-mentioned messages 203, 204, 303, 304, 403, and 404. For example, the message may indicate resources reserved for execution of the HO, e.g., a signature applied by the wireless communication device in a random access procedure for accessing the cell of the target base station. Further, the message to the respective candidate base station may indicate an identity of the wireless communication device. Further, the message to the respective candidate base station may indicate radio resources for monitoring the at least one UL signal.

In some scenarios, the wireless communication device performs channel quality measurements on DL reference signals received from the source base station and the candidate base stations and sends a report of the channel quality measurements to the source base station. The base station may then select the candidate base stations on the basis of the reported channel quality measurements.

At step 720, sends a message to the wireless communication device. The message indicates authorization of the HO of the wireless communication device from the source base station to one of a plurality of candidate base stations which are prepared to act as the target base station of the HO, e.g., the candidate base stations prepared steps 710. Further, the message instructs the wireless communication device to send the at least one UL signal. An example of such message is the above-mentioned message 205 or 305.

In some scenarios, the wireless communication device performs channel quality measurements on DL reference signals received from the source base station and the candidate base stations and sends a report of the channel quality measurements to the source base station. The base station may then send the message of step 720 in response to the report received from the wireless communication device. However, other criteria could be apply alternatively or in addition for initiating sending of the message of step 720.

The message of step 720 may indicate a configuration applied by the wireless communication device for sending the at least one UL signal. For example, the message of step 720 may indicate radio resources for sending the at least one UL signal.

The message of step 720 may also indicate resources reserved for the HO. For example, the message can indicate a signature sequence to be used by the wireless communication device for a random access procedure for accessing a cell of the target base station of the HO, e.g., a random access preamble.

At step 730, the source base station obtains at least one measurement of the UL signal. This involves that the source base station receives at least one report of a measurement performed by at least one of the candidate base stations on the at least one UL signal. Further, this may involve that the source base station receives the UL signal from the wireless communication device and performs at least one measurement based on the received UL signal.

At step 740, the source base station controls the HO based on the measurements obtained at step 730. This may involve selecting one of the candidate base stations as the target base station of the handover based on the obtained measurements. Further, this may involve deciding whether and when to trigger the HO.

In some scenarios, the source base station sends a further message triggering the handover and indicating the candidate base station, which based on the obtained measurements was selected as the target base station of the HO. The source base station may send the further message directly to the wireless communication device, such as in the exemplary processes of FIG. 2. However, the source base station may also send the further message via one of the candidate base stations, e.g., such as in the exemplary processes of FIG. 3.

In some scenarios, the source base station may start a timer upon sending the message of step 720 to the wireless communication device. Upon expiry of the timer, the base station may cancel the authorization of the HO and releases the resources reserved for execution of the HO.

In some scenarios, the source base station may send a further message to the wireless communication device. The further message to the wireless communication device may indicate cancellation of the authorization of the HO and instruct the wireless communication device to release the resources reserved for the HO. An example of such further message is the above-mentioned message 410.

In some scenarios, the source base station may send a further message to the wireless communication device. The further message to the wireless communication device may indicate cancellation of the authorization of the HO and instruct the wireless communication device to stop the sending of the UL signal. An example of such further message is the above-mentioned message 410.

In some scenarios, the source base station may send a further message to each of the candidate base stations. The further message to the respective candidate base station may indicate cancellation of the authorization of the HO and instructs the candidate base station to release the resources reserved for the HO. The above-mentioned messages 411 and 412 are examples of such further messages.

Figure 8:
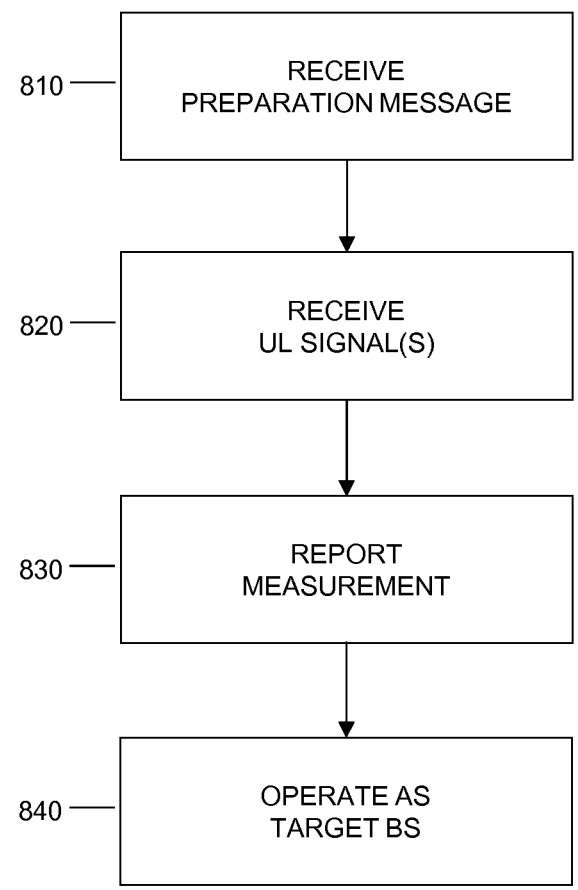
FIG. 8 shows a flowchart for illustrating a further method according to an embodiment of the invention.

FIG. 8 shows a flowchart illustrating a method of controlling communication in a wireless communication network, by which a base station of the wireless communication network, e.g., the above-mentioned base station 120 or 130 may implement concepts as described above. Specifically, the method may be used for controlling an HO of a wireless communication device, such as the above-mentioned UE 100, from a source base station to a target base station, specifically to control the HO on the basis of at least one UL signal transmitted by the wireless communication device. The at least one UL signal may include at least one UL reference signal and/or at least one random access preamble or similar predefined signal sequence. The method may be used for controlling the base station to operate as a candidate base station which may be selected as a target base station of the HO. The base station will in the following thus also be referred to as candidate base station. In some scenarios, the HO may be controlled on the basis of multiple UL signals transmitted by the wireless communication device, e.g., cell-specific UL reference signals which differ from base station to base station. If a processor based implementation of the base station is utilized, at least a part of the steps of the method may be performed and/or controlled by one or more processors of the base station.

At step 810, the candidate base station receives a message preparing the candidate base station to act as a target base station of the HO of the wireless communication device from the source base station. Examples of such messages are the above-mentioned messages 203, 204, 303, 304, 403, and 404. For example, the message may indicate resources reserved for execution of the HO, e.g., a signature applied by the wireless communication device in a random access procedure for accessing the cell of the target base station. Further, the message to the respective candidate base station may indicate an identity of the wireless communication device. Further, the message to the respective candidate base station may indicate radio resources for monitoring the at least one UL signal.

At step 820, the candidate base station receives the at least one UL signal from the wireless communication device and performs measurements based on the received UL signal, e.g., channel quality measurements. This is accomplished in response to receiving the message of step 810 and may utilize information provided in the message of step 810.

At step 830, the candidate base station sends a report of the measurements to the source base station. Examples of such report are the above-mentioned reports 208, 208, 307, 308, 407, 408, 507, and 508. The measurements may then be used by the source base station as a basis for controlling the HO. For example, the source base station may decide on the basis of the measurements whether and when to trigger the HO. Further, the source base station may select the target base station of the HO based on the measurements.

In some scenarios, if the source base station selects the candidate base station as the target base station of the HO and decides to trigger the HO, the candidate base station may assist in triggering the HO by sending a message to the wireless communication device. The message to the wireless communication device may trigger the HO: Further, the message may indicate that the candidate base station was selected as the target base station of the HO. The sending of the message to the wireless communication device may be instructed by the source base station, or the candidate base station may receive the message from the source base station and then forward it to the wireless communication device. The candidate base station may send the message directly via a radio link connecting the wireless communication device to the source base station.

In some scenarios, the candidate base station receives a further message from the source base station. The further message from the source base station indicates cancellation of the authorization of the HO and instructs the candidate base station to release resources reserved for the HO. In response to receiving the further message, the candidate base station may release the resources reserved for the HO and stop monitoring the UL reference signal.

At step 840, if the source base station selects the candidate base station as the target base station of the HO and decides to trigger the HO, the candidate base station may then continue to operate as the target base station of the HO. This may for example involve performing a random access procedure with the wireless communication device so as to allow access of the wireless communication device to the cell of the target base station.

Figure 9:
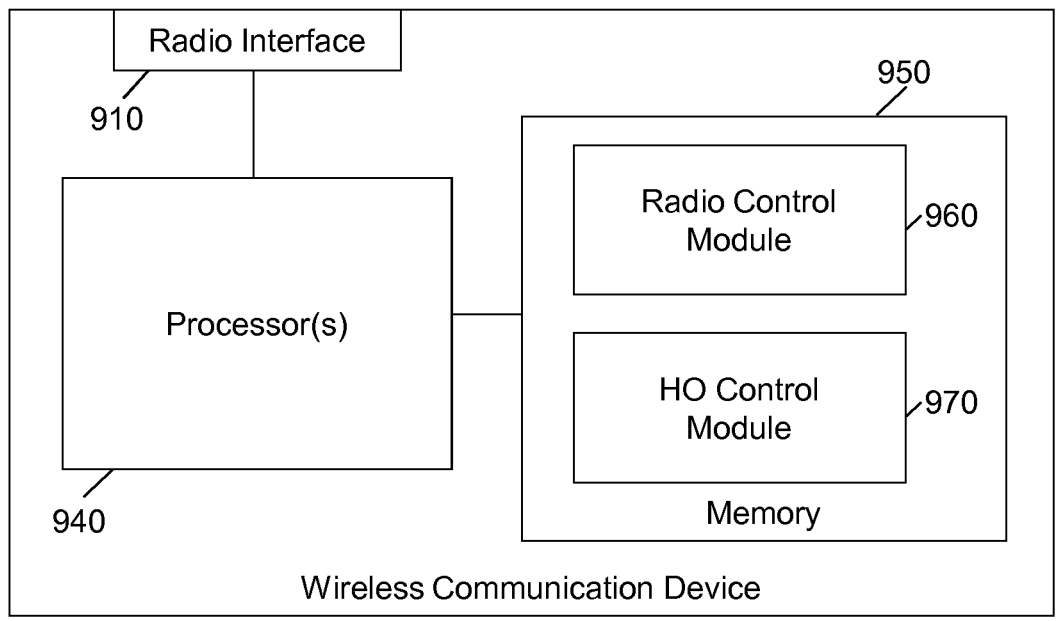
FIG. 9 schematically illustrates a processor-based implementation of a wireless communication device according to an embodiment of the invention.

FIG. 9 shows a block diagram for schematically illustrating a processor based implementation of a wireless communication device which may be utilized for implementing the above concepts. The wireless communication device may for example correspond to a UE, such as above-mentioned UE 100.

As illustrated, the wireless communication device includes a radio interface 910. The wireless communication device may utilize the radio interface 910 for connecting to a wireless communication network, e.g., through a base station of the wireless communication network, such as one of the base stations 110, 120, 130. Further, the wireless communication device may utilize the radio interface 910 for sending the above-mentioned UL signal(s).

Further, the wireless communication device is provided with one or more processors 940 and a memory 950. The radio interface 910, and the memory 950 are coupled to the processor(s) 940, e.g., using one or more internal bus systems of the wireless communication device.

The memory 950 includes program code modules 960, 970 with program code to be executed by the processor(s) 940. In the illustrated example, these program code modules include a radio control module 960 and an HO control module 970.

The radio control module 960 may implement and control functionalities of establishing, maintaining, releasing, and utilizing a radio connection via the radio interface 910. The HO control module 970 may implement the above-described functionalities of supporting control of the HO by sending the UL signal(s) and/or the above-described functionalities of cancelling an authorized but not executed HO.

It is to be understood that the structures as illustrated in FIG. 9 are merely exemplary and that the wireless communication device may also include other elements which have not been illustrated, e.g., structures or program code modules for implementing known functionalities of a UE or other type of wireless communication device.

Figure 10:
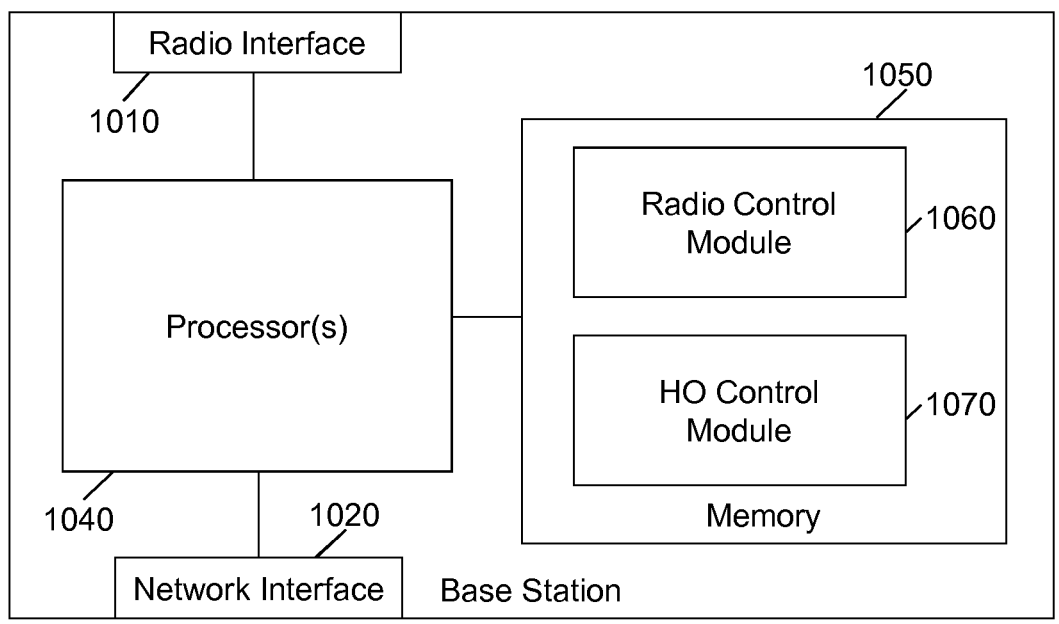
FIG. 10 schematically illustrates a processor-based implementation of a base station according to an embodiment of the invention.

FIG. 10 shows a block diagram for schematically illustrating a processor based implementation of a base station of a wireless communication network which may be utilized for implementing the above concepts, e.g., of the above-mentioned base station 110, 120, 130.

As illustrated, the base station includes a radio interface 1010. The base station may utilize the radio interface 1010 for connecting to a wireless communication device, such as the above-mentioned UE 100. Further, the base station may utilize the radio interface 1010 for receiving the UL signal(s). As further illustrated, the base station is provided with a network interface 1020, which may be used for connecting to other nodes of the wireless communication network, e.g., to other base stations or to core network nodes.

Further, the base station is provided with one or more processors 1040 and a memory 1050. The radio interface 1010, and the memory 1050 are coupled to the processor(s) 1040, e.g., using one or more internal bus systems of the base station.

The memory 1050 includes program code modules 1060, 1070 with program code to be executed by the processor(s) 1040. In the illustrated example, these program code modules include a radio control module 960, and a measurement management module 1070.

The radio control module 1060 may implement and control functionalities of establishing, maintaining, releasing, and utilizing a radio connection via the radio interface 1010. The HO control module 1070 may implement the above-described functionalities of controlling the HO as the source base station, e.g., as explained in connection with FIG. 7, or functionalities of supporting control of the HO as the candidate base station, e.g., as explained in connection with FIG. 8. In this connection, it is noted that in typical scenarios the base station would be configured to be operable both as the source node of an HO and a potential target node of an HO.

It is to be understood that the structures as illustrated in FIG. 10 are merely exemplary and that the base station may also include other elements which have not been illustrated, e.g., structures or program code modules for implementing known functionalities of a base station.

It is to be understood that the concepts as explained above are susceptible to various modifications. For example, the concepts could be applied in connection with various kinds of radio technologies and radio devices, without limitation the LTE radio technology or NR technology. Further, it is noted that the concepts may be applied in connection with various numbers of candidate base stations. Further, it is noted that the above-described cancellation of the authorization of the HO, using messages and/or timers, and associated releasing of resources reserved for the HO may also be used independently of the UL signal based control of the HO. In the latter case, the sending of the UL signal(s) as well as the measurements of the UL signals and reporting thereof could be omitted.

The invention claimed is:

1. A method of controlling communication in a wireless communication network, the method comprising:
a wireless communication device receiving a message from a base station, the message from the base station indicating authorization of a handover of the wireless communication device from the base station to at least one candidate base station which is prepared to act as a target base station of the handover, wherein a plurality of candidate base stations are prepared to act as the target base station of the handover;
in response to the message, the wireless communication device sending at least one uplink signal for measurement by at least one candidate base station; and
the wireless communication device receiving a further message triggering the handover, wherein the further message indicates the candidate base station, which based on the measurement, was selected as the target base station of the handover.

2. The method according to claim 1,
wherein the message from the base station indicates at least one of a configuration to be applied by the wireless communication device for sending the at least one uplink signal, or resources reserved for the handover.

3. The method according to claim 1, comprising:
the wireless communication device starting a timer upon receiving the message from the base station; and
upon expiry of the timer, the wireless communication device performing at least one of:
stopping sending of the at least one uplink signal; or
cancelling the authorization of the handover and releasing resources reserved for the handover.

4. A method of controlling communication in a wireless communication network, the method comprising:
a base station sending a message to a wireless communication device, the message indicating authorization of a handover of the wireless communication device from the base station to at least one candidate base station which is prepared to act as a target base station of the handover, and instructing the wireless communication device to send at least one uplink signal;
the base station receiving at least one report of a measurement performed by the at least one candidate base station on the at least one uplink signal; and
based on the at least one measurement, the base station controlling the handover.

5. The method according to claim 4, comprising:
wherein a plurality of candidate base stations are prepared to act as the target base station of the handover,
wherein based on the measurements, the base station selects one of the candidate base stations as the target base station of the handover,
wherein the base station sends a further message triggering the handover, and
wherein the further message indicates the candidate base station which based on the measurements was selected as the target base station of the handover.

6. The method according to claim 4, comprising:
the base station starting a timer upon sending the message to the wireless communication device; and
upon expiry of the timer, the base station cancelling the authorization of the handover and releasing resources reserved for execution of the handover.

7. The method according to claim 4, comprising:
the base station sending a message to the at least one candidate base station, the message to the at least one candidate base station preparing the at least one candidate base station to act as the target base station of the handover,
wherein the message to the at least one candidate base station indicates radio resources for monitoring the at least one uplink signal and/or resources reserved for execution of the handover.

8. The method according to claim 4, comprising:
the base station sending a further message to the at least one candidate base station, the further message to the at least one candidate base station indicating cancellation of the authorization of the handover and instructing the at least one candidate base station to release resources reserved for the handover.

9. A method of controlling communication in a wireless communication network, the method comprising:
- a base station receiving a message preparing the base station to act as a target base station of a handover of a wireless communication device from another base station, wherein a plurality of candidate base stations are prepared to act as the target base station of the handover;
- in response to the message, the base station receiving at least one uplink signal from the wireless communication device and performing measurements based on the received at least one uplink signal;
- the base station sending a report of the measurements to the other base station; and
- the base station sending a message triggering the handover to the wireless communication device, wherein the message triggering the handover indicates that the base station was, based on the measurements, selected among the plurality of candidate base stations as the target base station of the handover.

10. The method according to claim 9, comprising:
- the base station starting a timer upon receiving the message preparing the base station; and
- upon expiry of the timer, the base station cancelling authorization of the handover and releasing resources reserved for execution of the handover.

11. A wireless communication device, comprising:
- a radio interface for connecting to a wireless communication network; and
- one or more processors configured to:
  - receive via the radio interface a message from a base station, the message from the base station indicating authorization of a handover of the wireless communication device from the base station to at least one candidate base station which is prepared to act as a target base station of the handover, wherein a plurality of candidate base stations are prepared to act as the target base station of the handover;
  - in response to the message from the base station, send via the radio interface at least one uplink signal for measurements by the at least one candidate base station; and
  - receive a further message triggering the handover, wherein the further message indicates the candidate base station, which based on the measurement, was selected as the target base station of the handover.

12. A base station for a wireless communication network, the base station comprising:
- a radio interface for connecting to a wireless communication device
- a network interface to other nodes of the wireless communication network; and
- one or more processors configured to:
  - via the radio interface, send a message to a wireless communication device, the message indicating authorization of a handover of the wireless communication device from the base station to at least one candidate base station, which is prepared to act as a target base station of the handover, and instructing the wireless communication device to send at least one uplink signal;
  - via the network interface, receive reports of measurements performed by the candidate base stations on the at least one uplink signal; and
  - control the handover based on the measurements.

13. A base station for a wireless communication network, the base station comprising:
- a radio interface for connecting to a wireless communication device
- a network interface to other nodes of the wireless communication network; and
- one or more processors configured to:
  - via the network interface, receive a message preparing the base station to act as a target base station of a handover of a wireless communication device from another base station, wherein a plurality of candidate base stations are prepared to act as the target base station of the handover;
  - in response to the message, receive via the radio interface at least one uplink signal from the wireless communication device and perform measurements based on the received at least one uplink signal;
  - via the network interface send a report of the measurements to the other base station; and
  - via the radio interface send a message triggering the handover to the wireless communication device, wherein the message triggering the handover indicates that the base station was, based on the measurements, selected among the plurality of candidate base stations as the target base station of the handover.

14. The method according to claim 1, comprising:
in response to receiving a further message from the base station, the wireless communication device performing at least one of:
- cancelling the authorization of the handover and releasing resources reserved for the handover; or
- stopping the sending of the at least one uplink signal.

15. The method according to claim 4, comprising:
the base station sending a further message to the wireless communication device, the further message to the wireless communication device indicating cancellation of the authorization of the handover and at least one of instructing the wireless communication device to release resources reserved for the handover or instructing the wireless communication device to release resources reserved for the handover.

16. The method according to claim 9, comprising:
in response to receiving a further message, the base station cancelling authorization of the handover and releasing resources reserved for the handover.

\* \* \* \* \*